(12) United States Patent
Buck et al.

(10) Patent No.: US 7,881,958 B2
(45) Date of Patent: Feb. 1, 2011

(54) BUSINESS DATA ANALYSIS

(75) Inventors: Jonathan Buck, London (GB); Jeffrey Merrihue, London (GB)

(73) Assignee: Accenture Global Services Ltd., Dublin (IE)

( * ) Notice: Subject to any disclaimer, the term of this patent is extended or adjusted under 35 U.S.C. 154(b) by 3107 days.

(21) Appl. No.: 10/215,343

(22) Filed: Aug. 8, 2002

(65) Prior Publication Data

US 2004/0030592 A1 Feb. 12, 2004

(51) Int. Cl.
*G06F 17/30* (2006.01)
(52) U.S. Cl. .............................. 705/10; 705/7
(58) Field of Classification Search ............. 705/7, 705/9, 10
See application file for complete search history.

(56) References Cited

U.S. PATENT DOCUMENTS

2001/0041996 A1* 11/2001 Eder .................. 705/7
2002/0013720 A1* 1/2002 Ozono et al. .......... 705/7
2002/0133368 A1* 9/2002 Strutt et al. ........... 705/1
2003/0093310 A1* 5/2003 Macrae .............. 705/8
2004/0088239 A1 5/2004 Eder

OTHER PUBLICATIONS

Mulhern, "Customer Profitability Analysis: Measurement, Concentration, and Research Directions", Journal of Interactive Marketing, vol. 13, No. 1, Winter 1999.*
Ross, "Performance-based strategic resource allocation in supply networks", Elseview, Int. J. Production Economics 63 (2000) 255-266.*

* cited by examiner

*Primary Examiner*—Lynda C Jasmin
*Assistant Examiner*—Thomas Mansfield
(74) *Attorney, Agent, or Firm*—Fish & Richardson P.C.

(57) ABSTRACT

A technique for analyzing business data includes gathering current profit data that includes at least one of category size data, market share data, and profit margin data. Profit factor data is also gather that includes at least one of category size change data, market share change data, and profit margin change data. Future profit data is calculated based on the current profit data and the profit factor data. The future profit data is displayed to a user.

20 Claims, 12 Drawing Sheets

Table of Profit Factor Data

|  | Data | Source |
|---|---|---|
| *Future Category Size:* | | |
| 26a | Category Revenue | Market Research Agency |
| | HH Penetration | Market Research Agency |
| | Consumption Rate | Market Research Agency |
| | Average Price Level | Client or Market Research Agency |
| | GDP | World Bank |
| | Population Trend | UN or other public records |
| | Disposable income | UN or other public records |
| *Future Market Share:* | | |
| 26b | Market Share | Market Research Agency |
| | Distribution | Market Research Agency |
| | Price | Market Research Agency |
| | Competitive Heat | Client or Advertising Agency |
| | Advertising Level | Client or Advertising Agency |
| | Brand Awareness | Market Research Agency |
| | Brand Image | Market Research Agency |
| *Future Profit Margin:* | | |
| 26c | Gross Profit Margin | Client |
| | Fixed Costs | Client |
| | Flexible Costs | Client |
| | Major Price Strategy Changes | Client |
| | Major Supply Chain Changes | Client |

|  | 2000 | | 2005 | |
|---|---|---|---|---|
|  | Value | Rank ( /342) | Value | Rank ( /342) |
| Revenue ($) | 4,567,891 | 170 | 995,952,201 | 3 |
| Profit ($US) | -2,398,274 | 350 | 298,785,660 | 3 |
| Margin | -53% | 341 | 30% | 64 |
| Market Share | 0% | 340 | 10% | 208 |
| Relative Image (%) | 179 | 24 | - | - |
| Relative Price (%) | 100 | 205 | - | - |
| Relative Innovation (%) | - | - | 125 | 1 |

BUSINESS DATA ANALYSIS

BACKGROUND

This invention relates to business data analysis.

Business organizations typically manage a portfolio of products on a global basis spanning across geographic areas such as regions, countries, or other areas. Product managers may be assigned to manage certain products in a geographic area. The business organizations may periodically evaluate the current financial performance of the product portfolio in order make decisions regarding future allocations of marketing funds to the appropriate product manager. To make such future allocations, the business organizations may require future financial data based on current financial data as well as data that may have the most impact on the financial data.

However, current business data analysis tools may not be able to assist the business organizations in making these future business decisions. For example, these tools may not be able to gather current data into a consistent format so as to be able to compare the data across a range of products and geographic areas. Moreover, these tools may lack the ability to produce accurate future financial data because these tools may not have access to accurate current data to be able to produce accurate future data. These tools may also lack the ability to select or evaluate business data that may have a significant affect on the current data. As a result, business organizations may not be able to allocate resources to the appropriate product or geographic area that may be most profitable resulting in missed marketing opportunities.

SUMMARY

In one aspect, the invention provides techniques for analyzing business data that includes gathering current profit data that includes at least one of category size data, market share data, and profit margin data. Profit factor data is gathered that includes at least one of category size change data, market share change data, and profit margin change data. Future profit data is calculated based on the current profit data and the profit factor data. The future profit data is displayed to a user.

The aforesaid techniques may include calculating future profit data based on a user selectable analysis level that includes at least one of a product level analysis and a geographic level analysis. The calculation of future profit data may include a calculation for a product on a geographic level that includes at least one of a global level, regional level, and a country level. The calculation of future profit data may include a calculation for at least one of a product category level, a product level, and a brand level. Future profit data may be displayed to a user in at least one of a bubble chart, ranked list, and a bar chart. The techniques may include providing financial resource allocation data based on the future profit data. The techniques also may include allocating financial resources based on the future profit data. At least one database may be used to store at least one of current profit data, profit factor data, and future profit data. The techniques also may include calculating future resource allocation data based on current profit data and future profit data.

The category size change data may include at least one of household penetration data, and household consumption data. The market share change data may include at least one of price premium data, distribution data, image data, and awareness data. The profit margin change data may include at least one of price change data, cost change data, and competitive heat data.

In a second aspect, the invention provides an apparatus adapted to perform the techniques disclosed in the first aspect.

In a third aspect, the invention provides an article comprising a computer-readable medium that stores computer executable instructions for causing a computer to perform the techniques disclosed in the first aspect.

In various implementations, the business analysis techniques may provide one or more of the following advantages. The techniques may integrate and format business data from external as well as internal sources into a single integrated computing platform. As a result, business organizations providing products across geographic areas can analyze business data related to the profitability of the products. This may allow businesses to make accurate and objective future business decisions such as the allocation of a marketing budget among products and geographic areas. The user can select the level of business data analysis such as across product levels and geographic levels.

The techniques may calculate future profit data based on current profit data and on profit factor change data such as product category change data, market change data, and profit margin change data. The techniques may allow the user to adjust the impact the profit factor change data may have on the future profit data. These adjustments may be based on factors such as the business being analyzed, the relationship of the profit factor data to the current profit data, the depth of analysis desired by the user, as well as the knowledge of the user.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
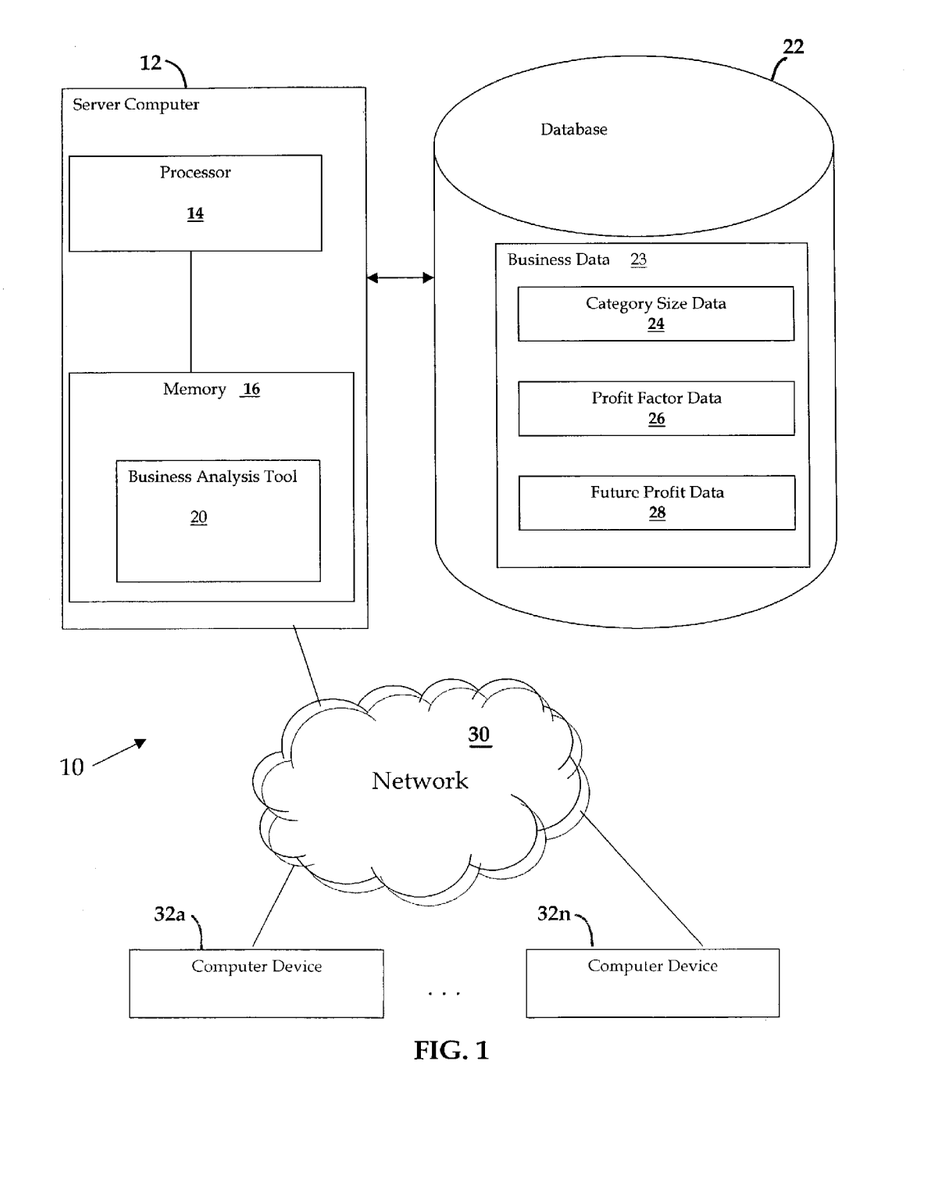
FIG. 1 is a block diagram of a business data analysis system according to an embodiment of the invention.

FIG. 1 is a block diagram of a business data analysis system 10 according to an embodiment of the invention. The system 10 includes a server computer 12 having a processor 14 for executing programs and processing data stored in memory 16. The computer 12 includes a business analysis tool 20 which can be a program that executes in memory 16 and that provides a user with analysis of business data. The analysis may allow the user to make future business decisions based on past and current business data including profit data related to the business of the user. The computer 12 is connected to a database 22 for storing business data 23 related to the operation of the tool 20. The business data 23 includes current profit data 24, profit factor data 26, and future profit data 28. Users can access the tool 20 over a network 30 through computer devices 32a-32n such as personal computers (PCs), personal digital assistants (PDAs), or other computer devices. The network 30 can include the Internet and network connections can be established using wired as well as wireless techniques.

The business analysis tool 20 may provide a user with business data to make future business decisions such as real-locating marketing investment resources, but the tool may be easily extended to provide data related other business areas such as research and development (R&D) funds, capital investments, or other areas. The tool 20 may provide reconciliation and analysis of multiple data sources resulting in the identification of regions, countries, categories and/or brands with the highest growth potential over the next several years. For example, a marketing manager of a business providing products across various geographic areas can access the tool 20 using a computer device 32a-32n, such as device 32a. The tool 20 may provide the manager with business data to allow the manager to make decisions regarding allocation of a marketing budget across product categories and geographic areas. The tool 20 gathers current profit data 24 related to products that the business manages in certain geographic areas as well as profit factor data 26 that may affect future profit data 28. The tool 20 may calculate future profit data 28 based on current profit data 24 and profit factor data 26. The tool 20 can provide a graphical user interface (GUI) to display the data in formats such as graphical, tabular, or other formats.

The business analysis tool 20 may allow the user to select and/or view current profit data 24, profit factor data 26, and future profit data 28 in different formats and at different product levels such as at a product category level, a product level, a brand level, or any combination of levels. In addition, the profit data 24, 26, 28 can be viewed at different geographic levels such as at a global level, a regional level, a country level, or a combination of levels. Thus, the marketing manager may be able to make a more informed budget allocation decision by comparing current profit data with future profit data based on factors that affect the profit data.

The business analysis tool 20 can be implemented using one or more programming languages and/or operating system (OS) platforms. For example, the tool 20 can be implemented using a spreadsheet program such as Microsoft Excel® and/or a database program such as Microsoft Access® operating on a Microsoft 2000® OS platform. A programming language, such as Visual Basic Application (VBA), can be used to program the logic of the tool 20 to process the business data 23 and to provide a GUI to the tool.

Although the business analysis tool 20 is shown residing on a server computer 12, other hardware and/or software implementations are possible. For example, the functionality of the tool 20 can be implemented on the computer device 32a and/or distributed between the server computer 12 and the computer device 32a. The tool 20 may provide future information for making a marketing budget allocation decision as well as other decisions in other business areas such as decisions related to RD funds, capital investments, human resources, or other business areas.

Figure 2:
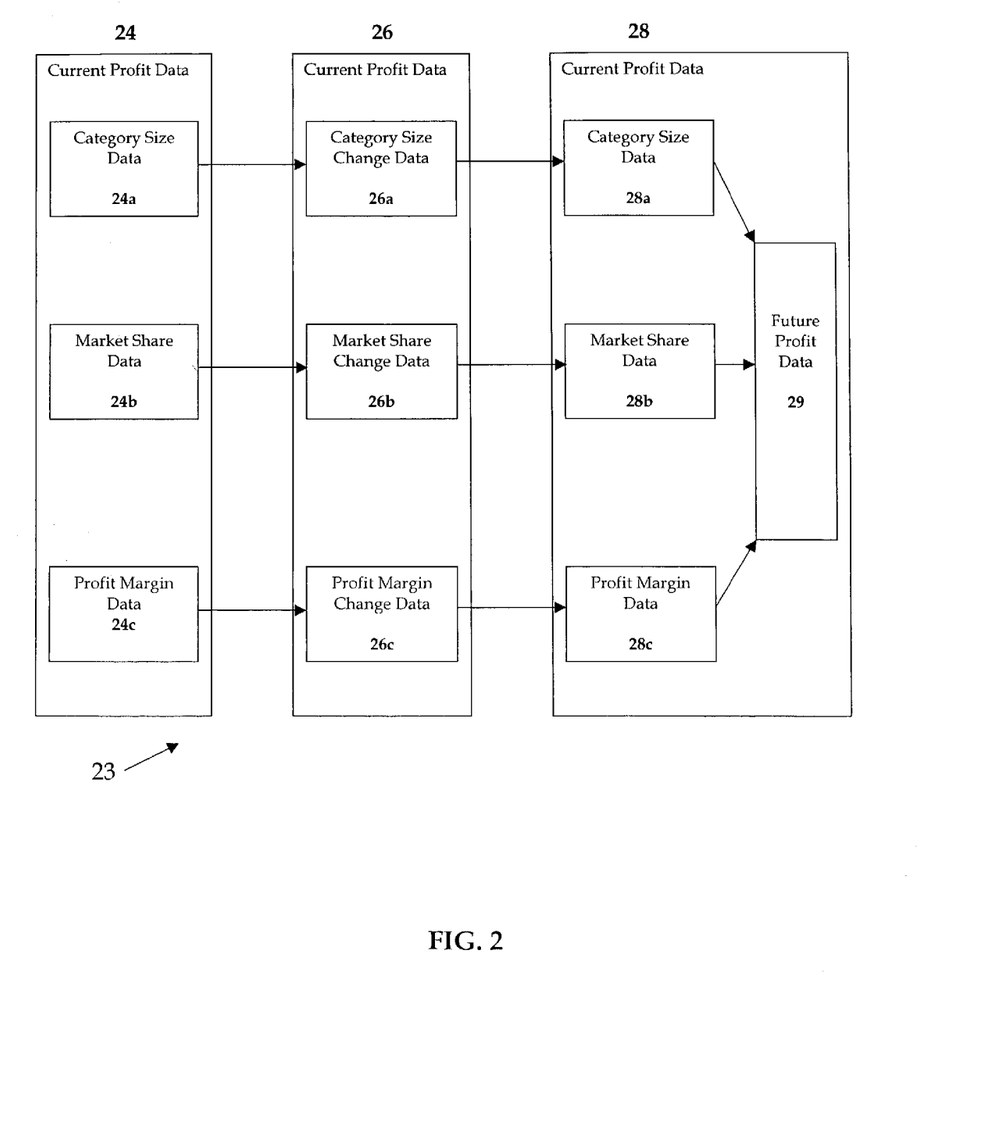
FIG. 2 is a data flow diagram of business data used in a business data analysis system according to an embodiment of the invention.

FIG. 2 is a detailed data flow diagram of business data 23 used in a business data analysis system 10 according to an embodiment of the invention. As mentioned above, future profit data 28 can be based on a combination of current profit data 24 and profit factor data 26.

The current profit data 24 includes data related to the calculation of current profit data. The current profit data 24 may include data such as category size data 24a, market share data 24b, and profit margin data 24c. As described in detail below, the current profit data 24 can provide a measure of the current profitability of a business operating in a market providing one or more products across one or more geographic areas. The business analysis tool 20 can use the current profit data 24, as well as the profit factor data 26 and the future profit data 28, to create one or more business matrices. The business matrices can be populated with this data to provide a measure of the profitability of the business in markets that span across one or more product levels and/or more geographic levels. Current profit data 24 can be calculated based on the following equation 1:

$$\text{Current Profit} = (\text{Category Size}) * (\text{Market Share}) * (\text{Profit Margin}) \quad (1)$$

Category size data 24a represents the amount of consumer spending during a relevant time period (i.e. annual, monthly, quarterly, or other periodic time basis) in a relevant geographic level and on a relevant product level which may be independent of the brand during a period of time. The market share data 24b represents the proportion of the category size data 24a which is spent on the relevant product and/or brand being analyzed. The profit margin data 24c represents the gross margin of the business related to the relevant product level and geographic level.

For example, a business in the consumer electronics industry may manufacture products such as televisions (TVs) and video camera recorders (VCRs). These products may be distributed across one or more geographic areas such as regions that include North America, Europe, and Asia as well as in one or more countries within each of these regions. Suppose that the business analysis tool 20 determines that the category size 24a amount is approximately $1,000,000 representing the amount that consumers spent on TVs last year in the United States (US) market. Further, suppose that the current market share 24b for TVs in the US is 10% and that the corresponding profit margin 24c for this product category is 50%. Thus, the current profit 24 for this business entity in the TV product category in the US geographic region is (calculated using equation 1):

$$(\text{Current Profit } \$50,000) = (\text{Category Size } \$1,000,000) * (\text{Market Share } 10\%) * (\text{Profit Margin } 50\%)$$

The business analysis tool 20 can use the current profit data 24 to populate cells in multi-dimensional business matrices. The tool 20 can display graphical representations of the business matrices to the user for further analysis (described in further detail below). The business matrices can include profit data for different combinations of product categories and geographical levels. In this example, a business matrix can provide current profit data for the TV product category across different geographical levels such as at a global level, a regional level, country level, or other geographic level.

The current profit data 24 can be gathered from a combination of data sources including a combination of internal and external data sources. The user of the tool can provide data from the internal data sources such as financial data such as profit and loss data, production reports, sales information, or other sources of internal financial data. The external data sources can include data from third party data vendors who specialize in the type of data relevant to the business of the user. The quantity and the quality of the data can be based on factors such as the business needs of the user, the cost of analysis and acquisition of the data, the granularity of the data required for analysis, or other factors.

The next group of business data 23 is profit factor data 26 which may include data that may have a significant impact on the future profitability of the particular business under analysis. In one implementation, the profit factor data 26 can include category size change data 26a, market share change data 26b, and profit margin change data 26c. These three profit factor data groups 26a, 26b, 26c represent data that is most relevant to the current profit data and contribute or drive future growth for the business that is being analyzed.

Figure 3:
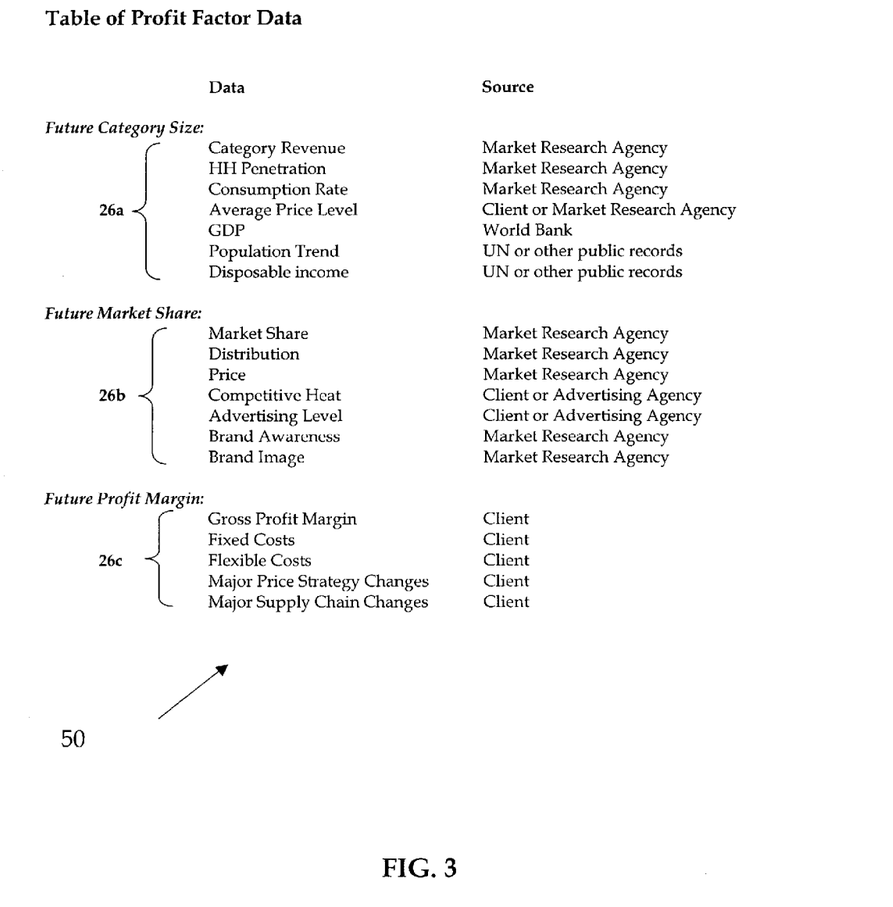
FIG. 3 is a table listing profit factor data according to an embodiment of the invention.

In general, category size change data 26a can include data that may affect the growth of a product category and may include data related to areas such as consumption/penetration, economic forecast, or other areas. Market share change data 26b can include data that may affect the market share of a product category and may include marketing data related to area such as distribution, pricing, advertising, innovation, competitive information, or other marketing areas. Profit margin change data 26c may include data that may affect profit margin of a product category and may include data related to areas such as pricing strategies, new factory plans, extensive changes to a supply chain, competitiveness of the product category, or other areas. The types and sources of profit factor data 26 can be derived from sources such as those listed in table 50 shown in FIG. 3. The table 50 indicates that the data sources can be based on a combination of internal (i.e. provided by the client/user) and external data sources (i.e. provided by a market research agency).

Specifically, category change data 26a is the first category of future growth where faster growing product categories may contribute relatively more to profit growth than slower moving categories. In one embodiment, there may be two primary groups of category change: "Household Penetration" and "Household Consumption". "Household Penetration" refers to the percentage of all households that have a given product at any given time. "Household Consumption" refers to the consumption rate of each household in a given category and/or geography at any given time. These factors may be obtained from usage and attitude or household panel studies.

Figure 6:
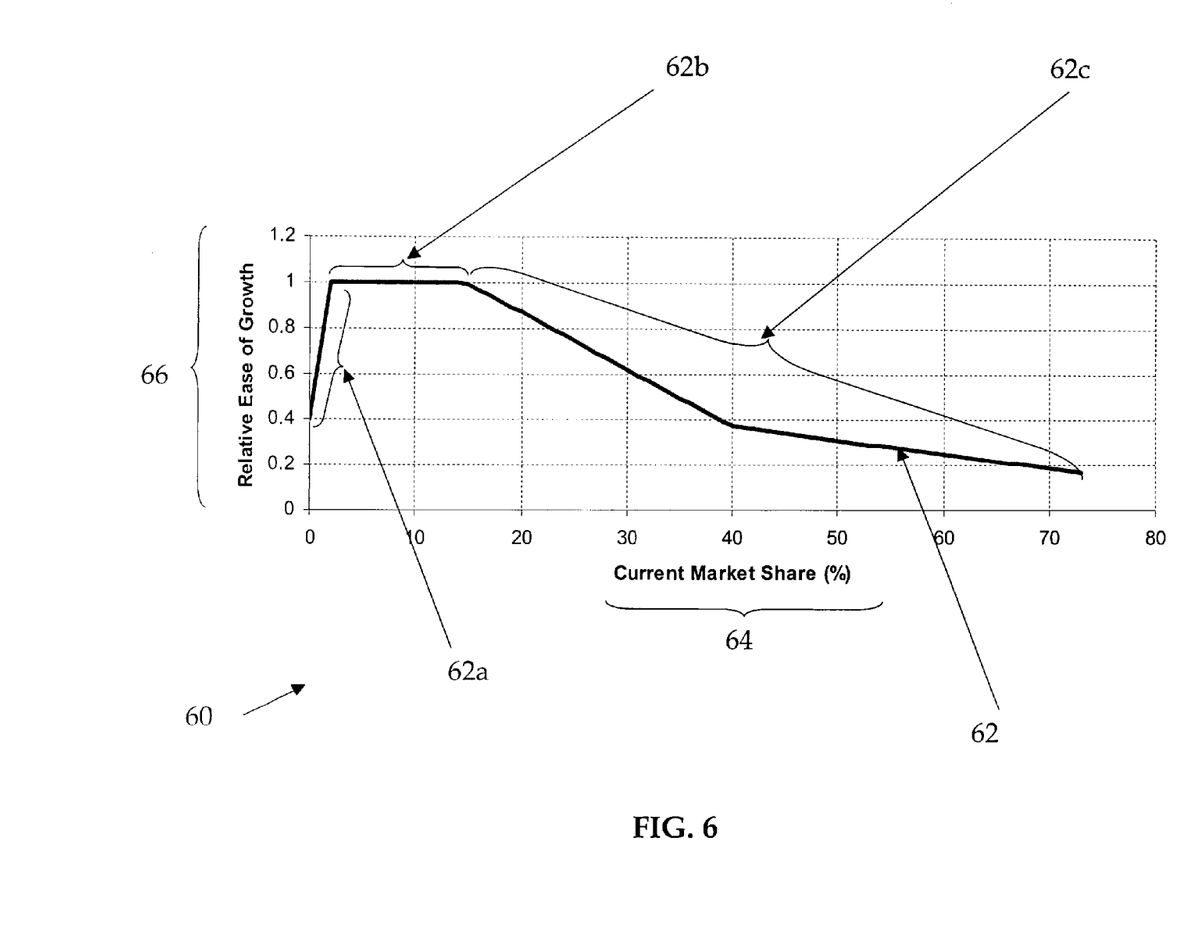
FIG. 6 is a data correction graph according to an embodiment of the invention.

The business analysis tool 20 may allow the user to adjust this data by applying a limit to growth. For example, the tool 20 can create and apply a curve that includes data from the least consuming to the highest consuming countries. This curve is typically s-shaped where countries with a lower level of saturation accelerate faster than those with a higher level of saturation. This curve can be constructed into the category component serving as a natural fact-based accelerator for lower consumption and a growth decelerator for more mature countries. The user can view the shape of this curve and may have the flexibility of adjusting the data to accelerate or decelerate the slope of the curve.(FIG. 6 shows an example s-shaped data correction curve described in detail below)

Market share change 26b is a second category of future growth where faster growing market shares will contribute relatively more to profit growth than slower moving or declining market shares. In one embodiment, there may be four primary groups of market share change data: "Price Premiums", "Distribution", "Awareness", and "Performance". "Price Premium" data refers to a price premium or discount to product category average price calculated for a brand in each category and country. Higher price premiums may restrict growth and lower price premiums may accelerate growth. These price positions are calculated globally and can be displayed in S-shaped modes, which can be viewed and adjusted by the user. "Distribution" data refers to a factor that may be used to calculate the amount future growth opportunity could be driven by increasing distribution presence in each country. Like most factors, "Distribution" may have a higher impact from a lower base and a lower impact from a higher base. The slope of this curve can be derived from graphing the relationship between share and distribution in each category around the world.

"Image" is another factor which may provide a measure of the relative strength of brand on the key discriminator in the category relative to the competition. High image may accelerate share in the future whereas low image may restrict share growth in the future. Likewise, "Awareness" data is a factor that may be similar to "Image" data in that high relative awareness may accelerate share growth whereas low relative awareness may restrict share growth in the future.

These factors may contain a facility to adjust the weight of one factor over another. A typical example may include adjusting the impact of "Innovation" data higher than the other three factors. "Innovation" is another growth driver and refers to the amount of innovation introduced into products by a business and the impact that the innovation may have on the market share.

Profit margin change data 26c is a third category of future growth where faster growing margin may contribute relatively more to profit growth than flat or declining margin. In one embodiment, there may be three primary drivers of profitability change: "Price Changes", "Cost Changes", and "Competitive Heat." "Price Change" is a factor that may indicate the significance of changes in pricing due to a change in strategy (i.e. becoming an ultra premium product) or a change in price due to tariffs and taxes. Smaller pricing changes may be ignored for allocation purposes. "Cost changes" is a factor that may track significant changes in cost due to a change in strategy (i.e. upgraded ingredients) or production efficiency (i.e. a new factory that lowers both manufacturing and distribution costs). Minor cost variations may be ignored based on the type of business and the product category of the market. "Competitive Heat" is a factor that may provide a measure of advertising weights calculated for each brand and its competitors to establish so called share of voice (SOV). Minimum and maximum weights can be calculated for each category in each country and can be weighted upward or downward using a relative s-shape curve as described above. The slope of this curve can then be increased or decreased based on the user's advertising philosophy relative to the SOV and optimum weights.

The business analysis tool 20 may provide two levels of profitability impact: incremental gross margin which may be used as a primary driver of prioritization and investment allocation; net income after marketing investment which may be displayed to compare higher and lower profit scenarios for management decision-making.

The final group of business data 23 is future profit data 28 which may provide a measure of future profitability of a business. The future profit data can be based on the current profit data 24 and the profit factor data 26. Future profit data 28 can be based on future periods of time such as one or more years. The current profit data 24 may also be based on one or more past periods of time such as past years. Potential future profit data 29 can be based on category size data 28a, market share data 28b, and profit margin data 28c. In turn, category size data 28a can be based on category change size data 26a and category size data 24a. Likewise, market share data 28b and profit margin data 28c can be based on similar relationships. These relationships can be user selectable and can be based on factors that may be relevant to the business under analysis such as product categories, geographic levels, or other factors.

As described in detail below, the business analysis tool can 20 provide business data 23 in a single or distributed database. Future profit data 29 can be used to generate a forecast of future potential product category size, market share, and profit margin for each cell in a business matrix. These forecasts can be used by the business to make an initial evaluation of allocation of current scarce resources such as marketing funds to different marketing managers in different product categories and geographic areas.

Figure 4:
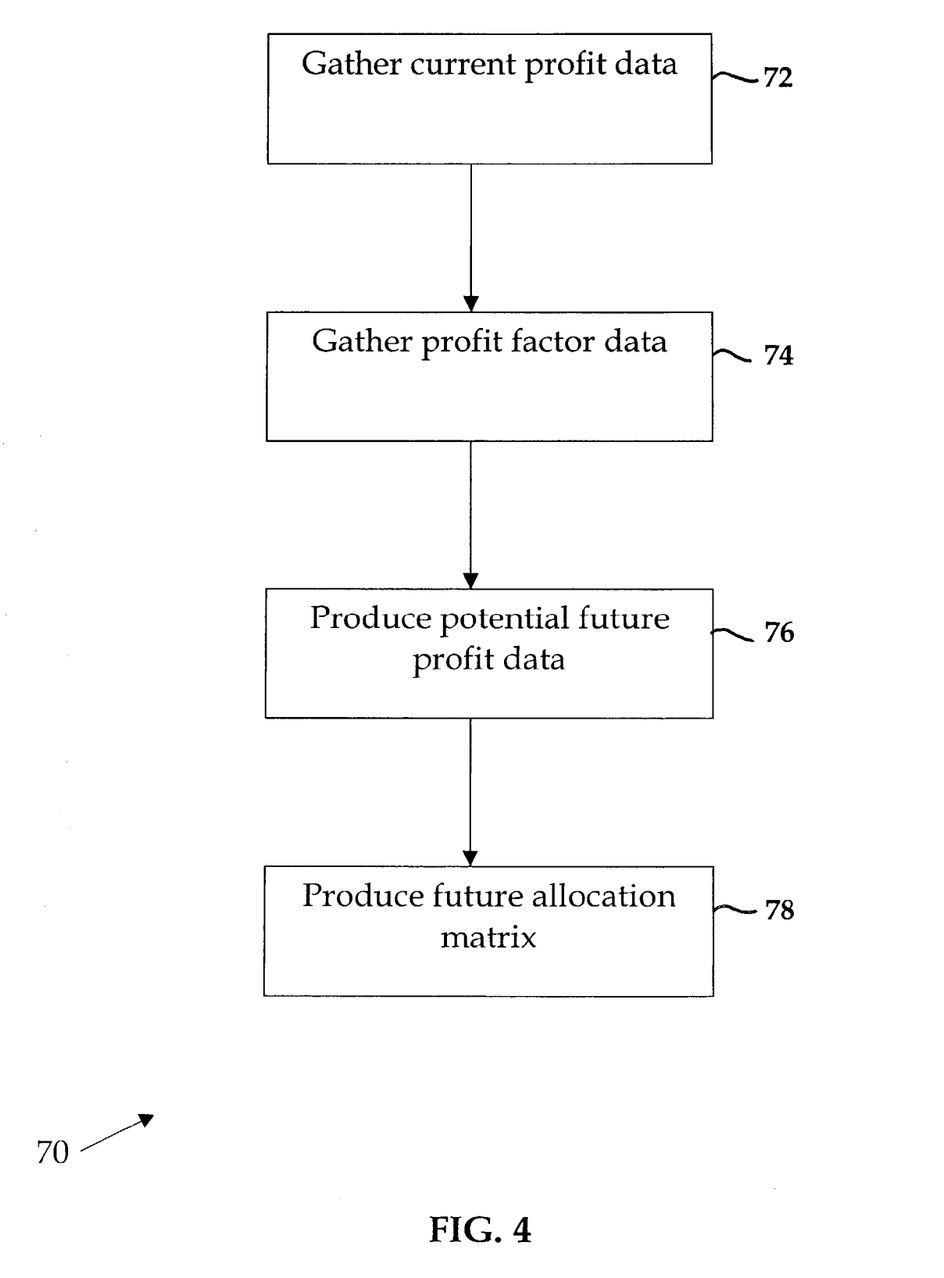
FIG. 4 is a flow chart of a business data analysis system according to an embodiment of the invention.

FIG. 4 is a flow chart 70 of a business data analysis system 10 according to an embodiment of the invention. The business analysis tool 20 may allow a business to gather business data 23 related to current profit 24, profit factor data 26 that may affect the future profit, and provide potential future profit data 28 that may allow the user to make future marketing allocation decisions. For example, the tool 20 may be used by a business organization such as a multinational business which manufactures products such as TVs and VCRs across one or more geographic regions such as regions North America, Europe, and Asia as well as in one or more countries within each of these regions. The tool 20 also can be used by other business organizations having different product portfolios and business structures.

Figure 5A:
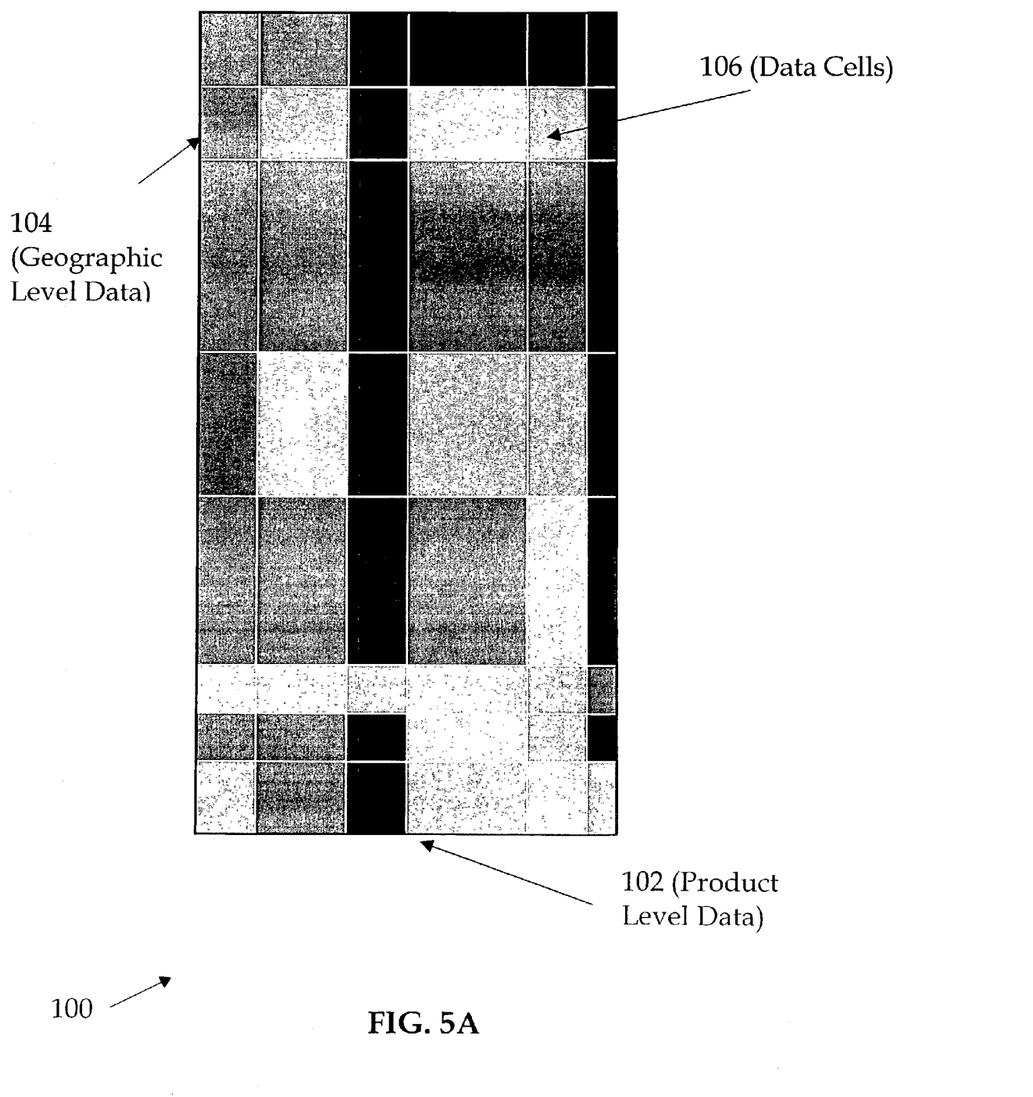
FIGS. 5A-5G are display output of a business data analysis system according to an embodiment of the invention.
Figure 5B:
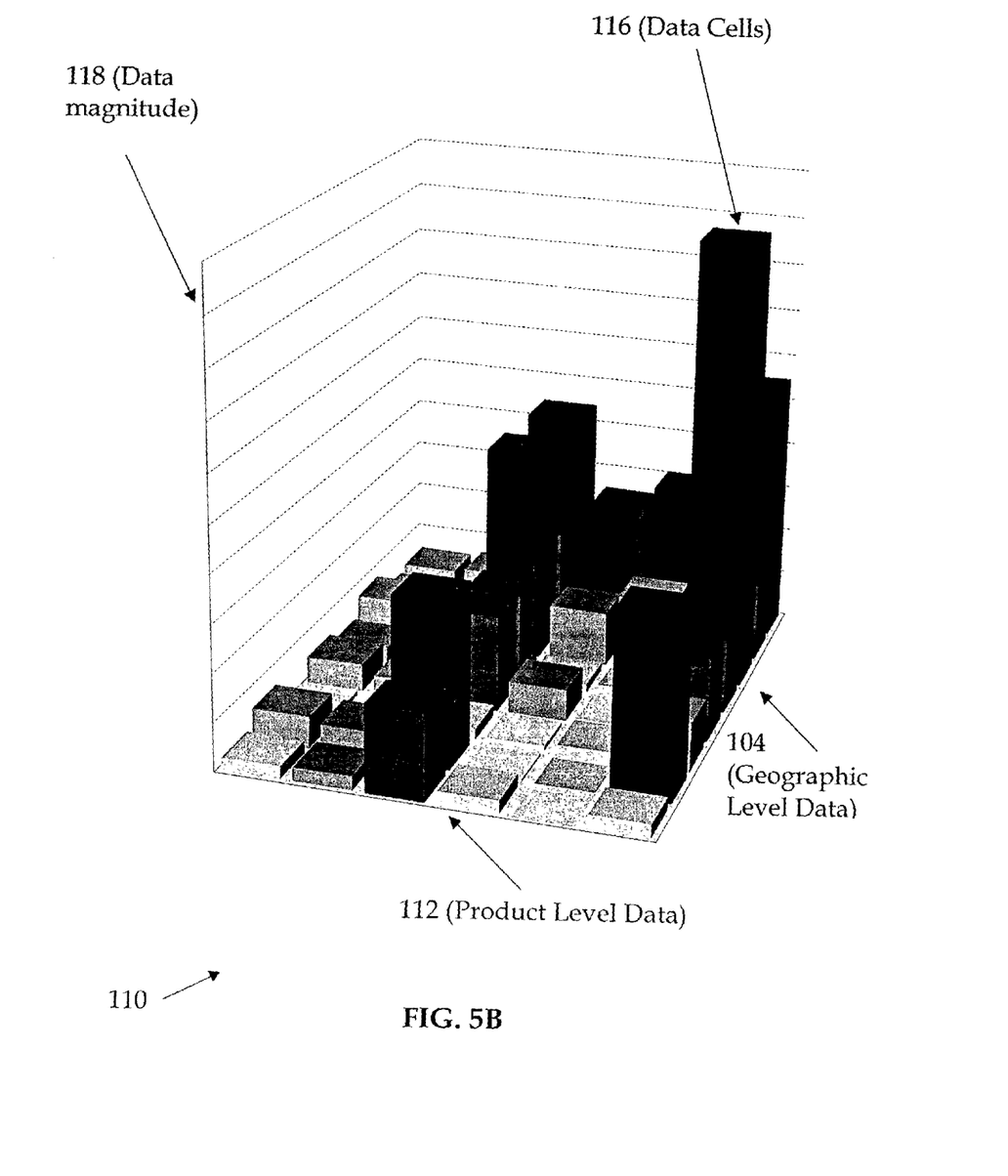

The business analysis tool 20 gathers (block 72) current profit data 24 from external as well as internal sources into the database 22. The tool 20 may create one or more multidimensional business matrices based on the current profit data 24 including category size data 24a, market share data 24b, and profit margin data 24c. FIG. 5A shows an embodiment of a multidimensional business matrix 100 that includes product level data along 102 the x-axis and geographic level data 104 along the y-axis. The business matrix 100 also includes data cells 106 representing business data such as category size data 24a, market share data 24b, profit margin data 24c, or other business data related to a product at a geographic level. FIG. 5B shows an implementation of a multi-dimensional bar graph 110 representation of the business matrix 100 in FIG. 5A. Similar to the business matrix 100, the bar graph 110 includes product level data 112 along the x-axis and geographic level data 114 along the y-axis. Likewise, the bar graph 110 includes data cells 116 representing business data such as category size data 24a, market share data 24b, profit margin data 24c, or other business data. In addition, the bar graph 110 includes magnitude data 118 representing the magnitude of the data cells 116 in units corresponding to the business data.

For example, lets assume that the business analysis tool 20 has determined from the business data that the category size data 24a amount is approximately $1,000,000 representing the amount that consumers spent on TVs last year in the US market. Further, suppose that the current market share data 24b for TVs in the US is 10% and that the corresponding profit margin 24c for this product category is 50%. Thus, the current profit data 24 for this business entity in the TV product category in the US geographic region is $50,000. (Calculated using equation 1 above) The tool 20 can use a business matrix to show current category size data and may populate a data cell with the value of $1,000,000 representing the category size of TVs in the US market. The remaining data cells can be populated with category size data of other products such as data related to VCRs in the US market. Likewise, the tool 20 can create a business matrix for current market share data and profit margin data for products across geographic levels.

The business analysis tool 20 may attempt to create a business matrix with data cells at the lowest level for analysis. However, the data gathered by the tool 20 and used to create the business matrix may be incomplete. For example, the business matrix may contain data at the product category level rather than at the product level or brand level. That is, the matrix may contain product category data related to consumer electronics but not product data related to TVs and VCRs. The business matrix may provide a visual indication of the data that may be incomplete and provide the user the ability to modify or update the data. The tool 20 constructs a repository of data into the database from all collected sources including external and internal sources. The tool 20 processes the data including checking the data to assure it is consistent. For example, the tool 20 may perform a sense checking operation against multiple data sources to assure consistency. The tool 20 also may make logical assumptions where data is unavailable or unreliable in order to construct a complete data set in the database.

The data can be formatted to allow aggregation of data sources for comparison purposes. For example, profit data related to a product can be provided at a country level so that it can be aggregated to a region level. Likewise, profit data can be provided at a product level so that it can be aggregated at a product category level. These features may permit a more detailed and accurate view of the profit data using the business matrix.

Once the current profit data 24 has been gathered, the business analysis tool 20 gathers (block 74) profit factor data 26. As mentioned above, the profit factor data 26 includes data that may have a significant impact on future profit data 28. The profit factor data 26 can be gathered from external and internal sources including those data sources indicated in table 50 in FIG. 3. The selection and use of particular profit factor data 26 may depend on factors such as the type of business being analyzed. For example, the user may have first hand knowledge based on historical data that category size change data 26a and profit margin data 26c may not have a significant impact on the future profitability of the business. On the other hand, market share change data 26b may have a significant impact on future profitability. As a result, market change size data 26b may have to be considered whereas category size change data 26a and profit margin change data 26c may be ignored.

The business analysis tool 20 then produces (block 76) future profit data 28 based on the current profit data 24 and the profit factor data 26. The relationship between the data can be based on factors such as user input, the nature of the product, the geographic area of the market of the user, or other factors. For example, a business may have determined that future profit data 28 may be impacted by market share data. The tool 20 may allow the user to select market share data to calculate future profit data. In addition, as mentioned above, the tool 20 may allow the user to select the level of analysis including the product level and the geographic level of analysis.

The user may provide the business analysis tool 20 with data relevant to the business and the market of the user. For example, the user may have determined that image data and price data are significant profit factor data. The tool 20 may calculate a "relative value index" based on a "relative price index" and a "relative image index". The "relative price index" is based on a ratio of the price of a product of the user's business compared to a price of other comparable products of competitors. Likewise, the "relative value index" is based on a ratio of the value of the user's product compared to the price of other comparable products of competitors. The tool 20 then calculates the "relative value index" which is based on the ratio of the "relative price index" over the "relative image index". The value of the "relative value index" is a ratio where a value less than one indicates that future profit based on market share is negatively impacted whereas a value greater than one indicates that future profit based on market share is positively impacted. This "relative value index" calculation can be performed across one or more product levels and geographic levels.

The business analysis tool 20 then calculates future market share data 28b based on the "relative value index" data and on current market share data 24a. The future market share data 28b calculation also may include other factors such as the life stage of the product category indicating the likelihood of change, revenue growth forecasts, or other factors that the user may consider important to future market share. The tool 20 can create and a display a business matrix populated with current market share data and future market share data to allow a user to analyze the data. The user can modify the data in the business matrix by adjusting the data used to calculate the business matrix. For example, the user can revise one or more profit factors or add other factors that may impact future market share data.

Figure 5C:
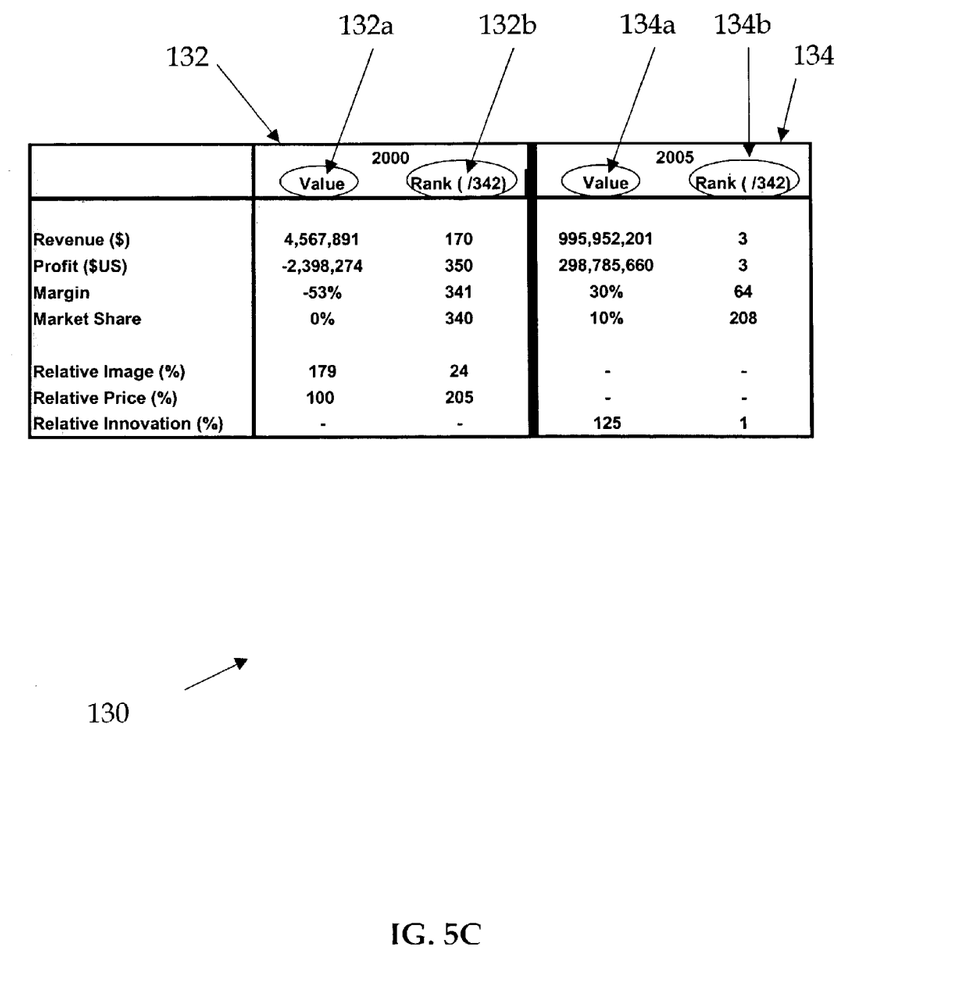

The business analysis tool 20 also can display a graphical representation of the future market share 28b relative to the current market share 24b to provide the user with insight into the relationship between the different data. For example, table 130 in FIG. 5C provides a table of product related data for two periods of time. The table 130 can be produced by having the user select a product from the business matrix. The table 130 includes a column of current data 132 for a current period and a column of data for a future period 134 such as 5 years from the current period. The current period column 132 includes value data 132a and rank data 132b for a product. Likewise, the future period column 134 includes value data 134a and rank data 134b for the product. The table 130 includes financial data and profit factor data related to a product that has been selected. The rank data 132b, 134b represents the relative rank of the product compared to other products in a business matrix. The table 130 reveals that future data related to the product may be larger compared to the current data for the product. This may suggest that the user should consider allocating more marketing funds to this product compared to other products.

Figure 5D:
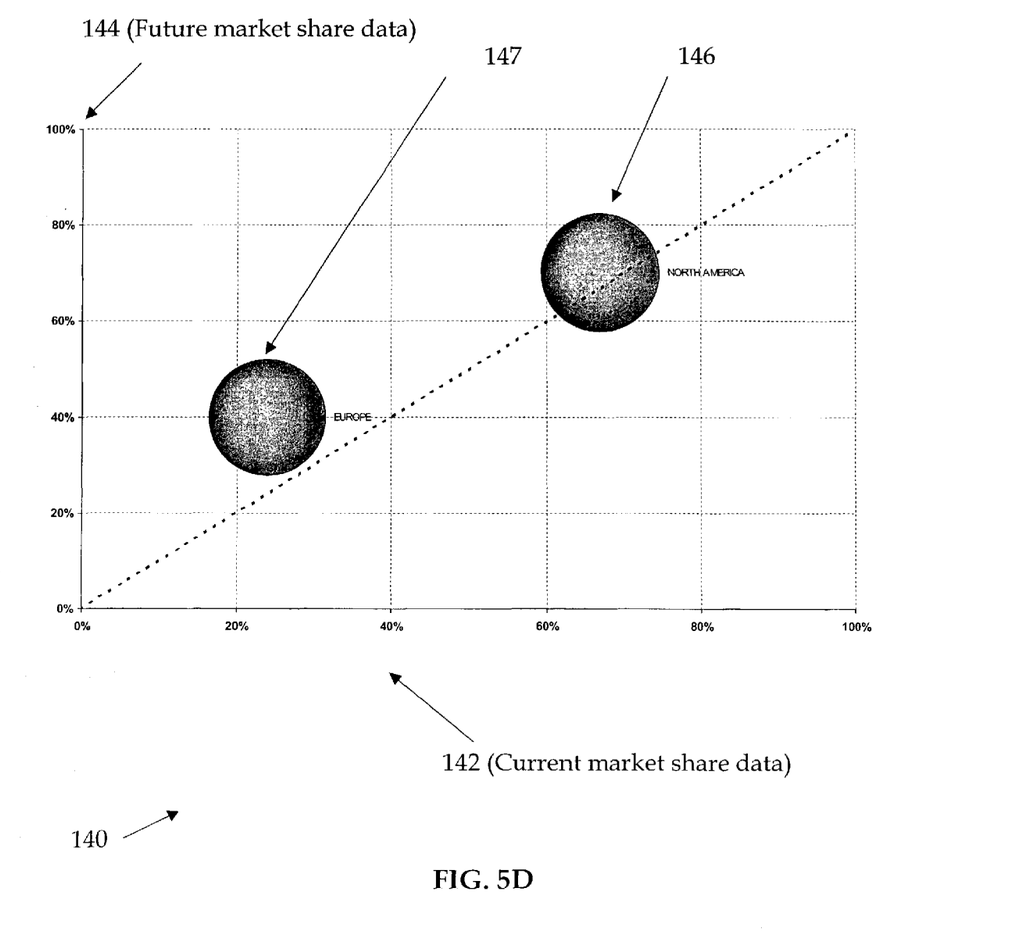

The business analysis tool 20 also can provide a bubble graph 140 representation of profit data as shown in FIG. 5D. The graph 140 shows current market share data 142 on the x-axis and future market share data 144 on the y-axis. The data points on the graph 140 are shown as bubbles, such as bubbles 146, 147, representing the amount of market share for all product categories in a particular region. For example, the graph 140 indicates that bubble 146, representing a product in the North American market, has a current market share of approximately 70% (x-axis) and that future market share may be approximately the same in the future (y-axis). In contrast, bubble 147, representing the same product except in the European market, indicates that the product has a current market share of approximately 30% and that future market share may increase to approximately 40%. The graph 140 suggests that the user should consider allocating approximately the same marketing funds to the product in the North American market (bubble 146) because this market appears to have leveled. On the other hand, the user may consider allocating more marketing funds to the product in the European market (bubble 147) because the data suggests that this market may be more profitable in the future. The tool may be capable of displaying data across different levels including across product levels and geographic levels. For example, a graph can be produced showing future and current market share data for one or more products in a particular region.

The future profit data 28 can be used to produce (block 108) future allocation data. The future allocation data can be provided in a graphical representation showing the amount of marketing funds to be allocated across different product and geographic levels. The future allocation data may include a calculation a prioritization index which may provide an indication of the attractiveness of allocating funds to a particular product and geographic area combination. The prioritization index may consider factors related to a product such as category revenue forecast, category growth forecast, future market share increase, future profit margin forecast, or other factors.

The business analysis tool 20 may apply additional mathematical techniques or criteria to the allocation data. For example, the tool 20 may apply a formal optimization algorithm because allocating a scarce resource with varying payback is considered a complex mathematical problem with no simple algebraic solution. Possible mathematical techniques may include genetic algorithms, system dynamic simulations, or other mathematical techniques. The allocation data also may be subject to expenditure constraints such as minimum and maximum expenditure levels for each product (i.e. based on default values or user-input), diminishing return functions, or other constraints.

Figure 5E:
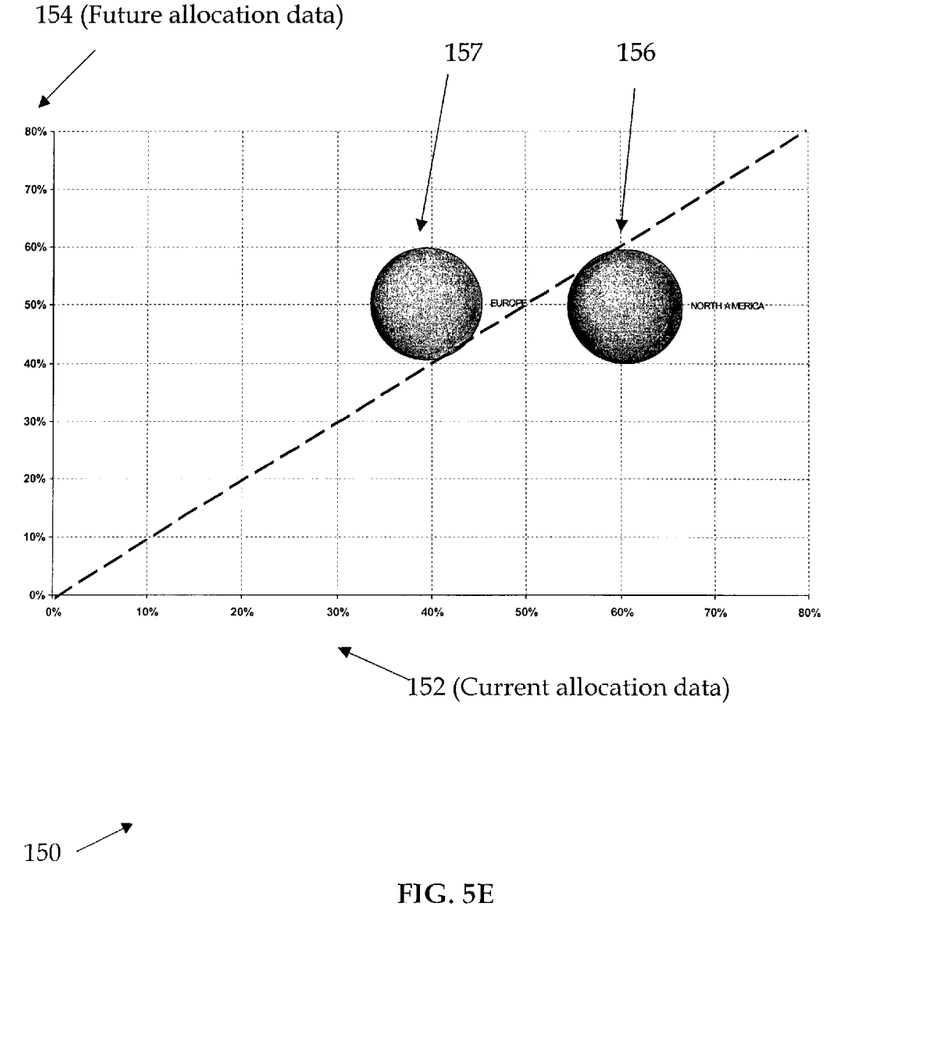

FIG. 5E illustrates an embodiment of future allocation graph 150 in the form of a bubble graph. The graph 150 shows the current marketing allocation 152 along the x-axis and future marketing allocation 154 along on the y-axis. Data point 156 represents the percentage of a marketing budget that a first product (i.e. Mobile Phone) has received in the past and the percentage that the tool recommends the first product should receive in the future. Likewise, data point 157 represents the percentage of a marketing budget that a second product (i.e. color monitor) has received in the past and the percentage that the tool recommends the second product should receive in the future. The graph indicates that the first product (bubble 156) has received approximately 60 of a marketing budget in the past and that product should receive approximately 50% of a future marketing budget. In contrast, the second product (bubble 157) indicates that has received approximately 40% of the current budget and that it should receive 50% of a future marketing budget. Thus, the graph provides a user with data that suggests that first product (bubble 156) should receive a decrease in its allocation budget whereas the second product (bubble 157) should receive an increase in its future allocation budget.

Figure 5F:
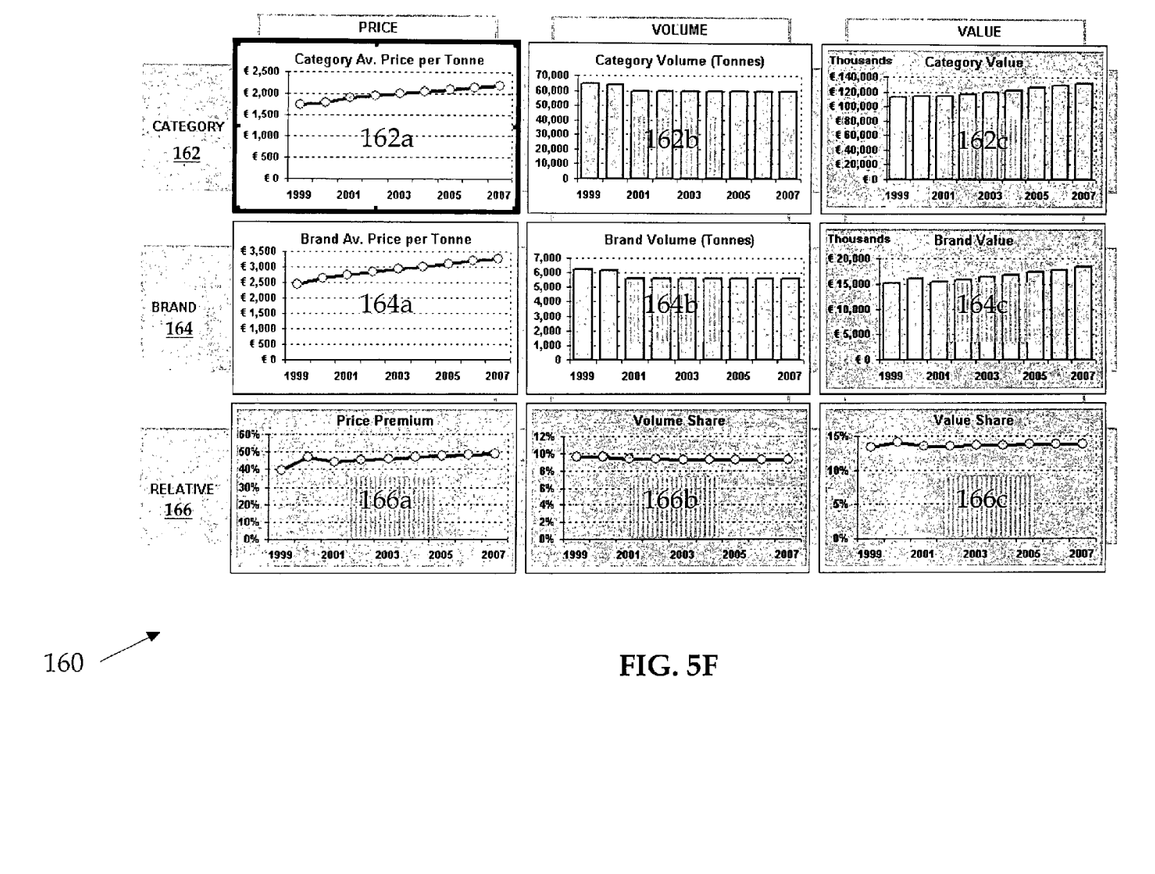
Figure 5G:
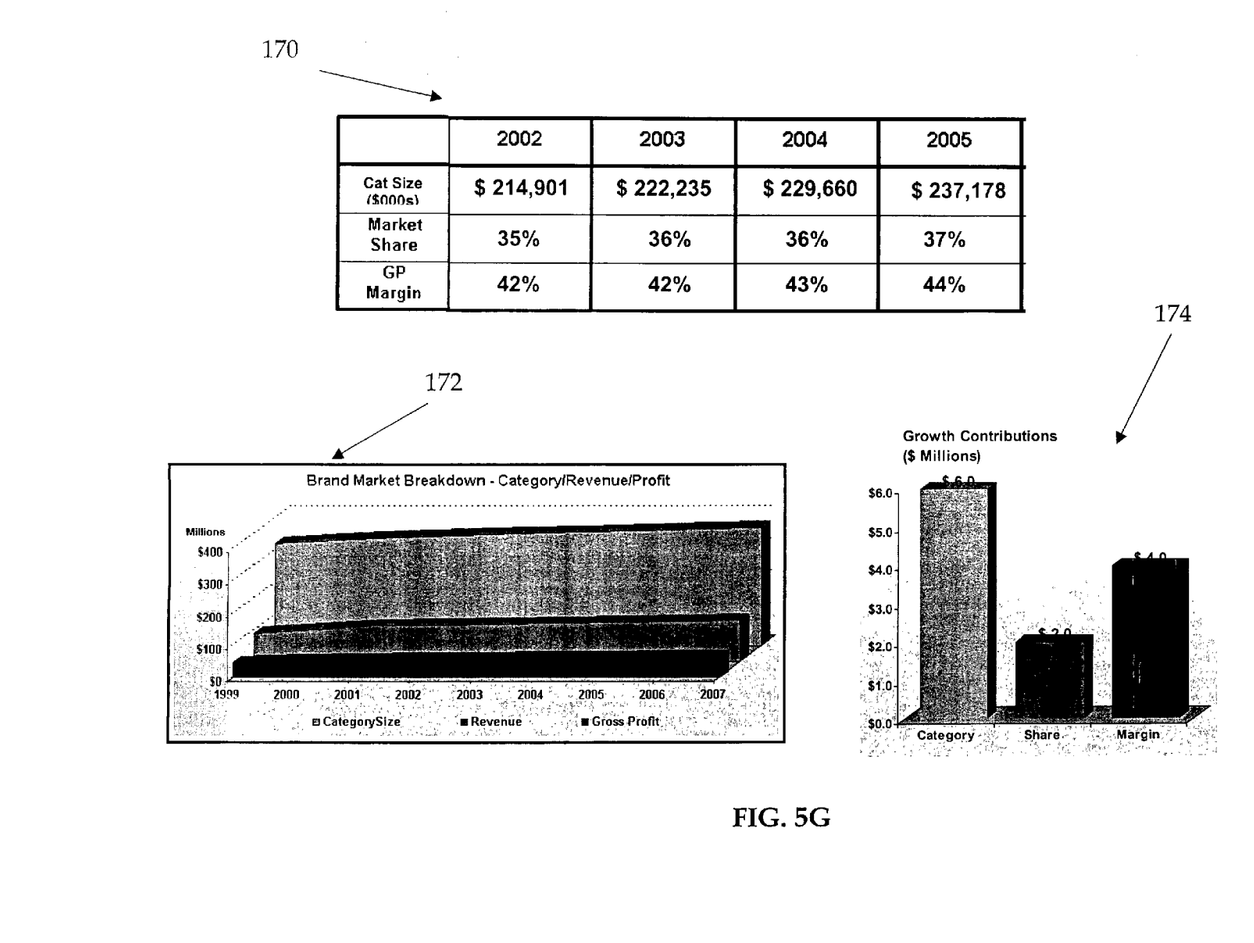

FIGS. 5F and 5G illustrate graphs of business data produced by the business analysis tool 20 according to an embodiment of the invention. These graphs illustrate the flexibility of the tool 20 in creating and displaying different types of graphs according factors such as the requirements of the user, the business under consideration, or other factors.

As shown in FIG. 5F, the business analysis tool 20 can produce a graph 160 that provides an indication of future market share of a product brand compared to other product brands in a product category over a period of time including current and future time periods. The graph 160 provides category related data 162, brand related data 164, and relative data 166 based on a ratio of the category related data 162 compared to the brand related data 164. The category related data 162 includes a price graph of the category 162a, a volume graph of the category 162b, and a value graph of the category 162c based on the results of the price graph 162a and the volume graph 162b. Likewise, brand related data 164 includes a price graph of the brand 164a, a volume graph of the brand 164b, and a value graph of the brand 164c based on the results of the price graph 164a and the volume graph 164b. Similar comments apply to the relative data 166. Price data 162a, 164a, 166a represent price data of the product category, the brand, and brand relative to the product category, respectively. Likewise, volume data 162b, 164b, 166b represent volume data of the product category, the brand, and brand relative to the product category, respectively. Finally, value data 162c, 164c, 166c represents market share data of the product category, the brand, and brand relative to the product category, respectively. As a result, the user may be able to compare the significance of a brand relative to the product category and the impact it may have on future market share.

FIG. 5G shows a table 170 and graphs 172, 174 of business data associated with a brand relative to profit data such as category size, profit margin, and revenue. Table 170 shows current and future business data for a brand. For example, gross profit in year 2001 for the brand was approximately $23,000 compared to a forecasted value of approximately $35,000 in year 2007 suggesting that the brand may be profitable in the future. Bar graph 172 provides a breakdown of brand financial data relative to category size, review, and profit. Bar graph 174 illustrates the contribution of the brand to profit growth. For example, the bar graph 174 shows that during a relevant time period the brand may contribute approximately $6,000,000 to category size, $2,000,000 to market share, and $5,000,000 to profit margin.

FIG. 6 is a data correction graph 180 according to an embodiment of the invention. The data correction graph 180 includes an s-shaped curve 182 that can be applied to market share data. The graph 180 includes current market share data 184 along the x-axis and relative ease of growth data 186 along the y-axis. The purpose of the s-shaped correction curve 182 is to take into account the fact that the ease with which a product brand can grow its market share may depends on its current market share. Market share data can be adjusted by applying the data correction curve 180 to provide a more accurate calculation of future profit data. If current market share is very low such as less than approximately 2% (represented by data range 182a), it may difficult to grow the brand due to low brand penetration and momentum. However, once market share is above approximately 2% (data range 182b), a critical mass point may have been reached and growth may become relatively much easier until current market share is above about 15%. Growth from market shares above approximately 15% (data range 182c) may steadily become more difficult as a result of diminishing returns and remaining headroom in the market may be become reduced.

To illustrate the use of the graph 180, assume that a business produces a first and second product. The first product may have a current market share of approximately 10% and a potential market share change of approximately 5% to produce a potential future market share of approximately 15%. On the other hand, the second product may have a current market share of approximately 30% and a potential market share change of approximately 3% to produce a potential future market share of approximately 33%. Based on the potential future market share data of the first and second products, it may appear that the market share of the second product (33%) may be greater than the first product (15%). The application of the correction curve 182 reveals that the first product has a current market share of approximately 10% which is in data range 182b whereas the second product has a current market share of approximately 30% which is in data range 182c. So, even though the second product may have a greater potential future market share compared to the first product, the second product may experience a more difficult growth in market share compared to the first product.

Various features of the system can be implemented in hardware, software, or a combination of hardware and software. For example, some features of the system can be implemented in computer programs executing on programmable computers. Each program can be implemented in a high level procedural or object-oriented programming language to communicate with a computer system. Furthermore, each such computer program can be stored on a storage medium such as read-only-memory (ROM) readable by a general or special purpose programmable computer or processor, for configuring and operating the computer to perform the functions described above.

A number of embodiments of the invention have been described. Nevertheless, it will be understood that various modifications may be made without departing from the spirit and scope of the invention. For example, the functionality of the business analysis tool can be implemented on a standalone computer or be implemented on a server computer and accessed from a remote computer over a network. Accordingly, other embodiments are within the scope of the following claims.

What is claimed is:

1. An apparatus for analyzing business data, comprising:
a memory; and
a processor coupled to the memory, wherein the processor is configured to:
gather current profit data that includes category size data, market share data, and profit margin data;
gather profit factor data that includes category size change data indicating a future change in a category size, market share change data indicating a future change in a market share, and profit margin change data indicating a future change in a profit margin, each of the indicated changes affecting a future profitability;
calculate future profit data based on the current profit data and the profit factor data; and
display the future profit data to a user.

2. The apparatus of claim 1 wherein category size change data includes at least one of household penetration data, and household consumption data.

3. The apparatus of claim 1 wherein market share change data includes at least one of price premium data, distribution data, image data, and awareness data.

4. The apparatus of claim 1 wherein the calculation of profit margin change data includes at least one of price change data, cost change data, and competitive heat data.

5. The apparatus of claim 1 wherein future profit data is based on a user selectable analysis level that includes at least one of a product level analysis and a geographic level analysis.

6. The apparatus of claim 1, wherein the calculation of future profits includes the calculation of future profits for a product on a geographic level that includes at least one of a global level, regional level, and a country level.

7. The apparatus of claim 1 wherein the calculation of future profit data includes at least one of a product category level, product level, and a brand level.

8. The apparatus of claim 1 wherein the display of future profit data to a user includes the display of the future profit data in at least one of a bubble chart, ranked list, and a bar chart.

9. The apparatus of claim 1 the processor is further configured to provide financial allocation data based on the future profit data.

10. The apparatus of claim 1 the processor is further configured to store in at least one database the current profit data, profit factor data, and future profit data.

11. An apparatus for analyzing business data, comprising:
a memory; and
a processor coupled to the memory, wherein the processor is configured to:
gather current profit data that includes at least one of category size data, market share data, and profit margin data;

gather profit factor data that includes at least one of category size change data, market share change data, and profit margin change;

calculate future profit data based on the current profit data and the profit factor data;

display the future profit data to a user; and calculate future resource allocation data based on the current profit data and the future profit data.

12. An article comprising a computer-readable medium that stores executable instructions for causing a computer system to:

gather current profit data that includes at least one of category size data, market share data, and profit margin data;

gather profit factor data that includes category size change data indicating a future change in a category size, market share change data indicating a future change in a market share, and profit margin change data indicating a future change in a profit margin, each of the indicated changes affecting a future profitability;

calculate future profit data based on the current profit data and the profit factor data; and display the future profit data to a user.

13. The article of claim 12 wherein instructions to calculate future profit data include instructions to allow a user to select an analysis level that includes at least one of a product level analysis and a geographic level analysis.

14. The article of claim 12 wherein instructions to calculate future profits include instructions to calculate future profits for a product on a geographic level that includes at least one of a global level, regional level, and a country level.

15. The article of claim 12 wherein instructions to calculate future profits include instructions to calculate future profits for at least a product category level, a product level, and a brand level.

16. The article of claim 12 wherein instructions to display future profit data to a user include instructions to display the future profit data in at least one of a bubble chart, ranked list, and a bar chart.

17. The article of claim 12 further comprising instructions to provide future allocation data based on the future profit data.

18. An article comprising a computer-readable medium that stores executable instructions for causing a computer system to:

gather current profit data that includes at least one of category size data, market share data, and profit margin data;

gather profit factor data that includes at least one of category size change data, market share change data, and profit margin change data;

calculate future profit data based on the current profit data and the profit factor data;

display the future profit data to a user; and allocate financial resources based on the future profit data.

19. An article comprising a computer-readable medium that stores executable instructions for causing a computer system to:

gather current profit data that includes at least one of category size data, market share data, and profit margin data;

gather profit factor data that includes at least one of category size change data, market share change data, and profit margin change data;

calculate future profit data based on the current profit data and the profit factor data;

display the future profit data to a user; and calculate future resource allocation data based on the current profit data and future profit data.

20. The article of claim 12 further comprising instructions to store in at least one database the current profit data, profit factor data, and future profit data.

* * * * *